United States Patent [19]
Dellner

[11] B 3,990,160
[45] Nov. 9, 1976

[54] BELT DRIVE FOR SCRAPER ELEVATOR DEVICE

[75] Inventor: Raymond P. Dellner, Strongsville, Ohio

[73] Assignee: General Motors Corporation, Detroit, Mich.

[22] Filed: Mar. 17, 1975

[21] Appl. No.: 558,819

[44] Published under the second Trial Voluntary Protest Program on February 3, 1976 as document No. B 558,819.

[52] U.S. Cl. .................................. 37/8; 74/231 C; 74/237; 198/372
[51] Int. Cl.² ...................... B60P 1/36; F16H 7/00
[58] Field of Search .............. 74/231 R, 231 P, 237, 74/231 C; 37/101, 102, 110, 108 R, 8; 198/172, 173, 174, 175, 176, 198

[56] References Cited
UNITED STATES PATENTS

| | | | |
|---|---|---|---|
| 2,322,967 | 6/1943 | Perry | 74/231 C |
| 2,803,504 | 8/1957 | Lynch | 74/231 C |
| 2,984,120 | 5/1961 | Hurry | 74/229 |
| 3,161,280 | 12/1964 | Creighton | 198/174 |
| 3,758,966 | 9/1973 | Miller | 37/8 |
| 3,831,358 | 8/1974 | Marsh et al. | 74/231 J |

*Primary Examiner*—Samuel Scott
*Assistant Examiner*—A. Russell Burke
*Attorney, Agent, or Firm*—Edward J. Biskup

[57] ABSTRACT

An elevating scraper having an elevator device provided with a pair of endless flexible belt members each of which is entrained about a drive sprocket wheel and the idler sprocket wheel. A plurality of equally spaced teeth are secured to the inner surface of each belt member for meshing engagement with both sprocket wheels and each pair of adjacent teeth pivotally supports a flight member at the outer surface of the belt member.

3 Claims, 6 Drawing Figures

BELT DRIVE FOR SCRAPER ELEVATOR DEVICE

The present invention concerns self-loading elevating scrapers and more particularly an elevator device for an elevating scraper that is adapted to be mounted in the forward open end of the scraper bowl and has a pair of endless flexible belt members that support a plurality of flight members.

One form of auxiliary loading mechanism commonly used with scrapers is an elevator device which consists of two endless chains each of which is entrained about vertically spaced sprocket wheels rotatably mounted on the opposite ends of a suspended frame. The chains carry a plurality of transversely extending flight members which serve to push material into the scraper bowl during a digging operation. One advantage in using this type of loading mechanism is that the elevating flight members serve to pick up material from the cutting blade and raise it towards the rear of the bowl to provide a heaped load.

One problem with the chain driven elevator device is that the life of the chain is relatively limited thereby necessitating frequent chain replacement which results in an increase in the operating cost of the scraper. The cause of the limited service life of the chain can in part be attributed to the accumulation of wear which takes place at each link pin as the chain engages and disengages the sprocket wheels. At this point, chain tension is maximum and the chain roller is subjected to a force from the sprocket tooth with wear occurring on the roller and on the pin bushing bearing surface as the link articulates and seats onto the sprocket. As the chain lengthens due to this wear, it no longer can mesh properly with the sprocket wheels.

Another problem with the use of chains on elevator devices is that flight member stability is limited by the length of the chain pitch with each flight member mounted entirely on one chain link.

The present invention contemplates an elevator device that dispenses with the usual chains for supporting and driving the flight members and substitutes flexible endless belts for such use. The endless belts tend to eliminate the chain wear of the type described above and also improves the stability of the flight members as they move between the wrap around the sprocket wheels. In the preferred form, the belt is made in sections with the length of each section being a multiple of the flight member pitch. Each belt section includes a plurality of parallel strands of wire cable each of which is securely anchored at the opposite ends to a transverse support member and both the cables and the support members are encased within an elastomeric material. Each flight member is supported on the belt member by an over/under mounting which locates a primary mounting point adjacent the inner surface of the belt member and locates the secondary mounting point adjacent the outer surface of the belt member. This arrangement provides a constant two-point support for each flight member on each belt member and assures stability of the latter as the belt moves along and over the sprocket wheels.

Accordingly, the objects of the present invention are to provide an improved elevator device having a pair of endless flexible belt members that support a plurality of transverse flight members at spaced points by mounting arrangements which pivotally carry each flight member at two points respectively located adjacent the inner surface and the outer surface of each belt member; to provide an improved endless flexible belt for an elevator device that supports a plurality of transverse flight members and is formed in separate sections each of which has a plurality of parallel wire cables encased within an elastomeric material; to provide an elevating scraper having an improved elevator device which is provided with endless flexible belts supporting flight members at points located on opposite sides of the belt member; and to provide an improved elevator device having a plurality of transverse flight members each of which is carried by a support plate which serves to space the flight member outwardly from the outer surface of the belt member and is connected at one point by a pivotal connection to the underside of the belt member and connected at another point to a flexible member secured to the outer surface of the belt member.

Other objects and advantages of the present invention will be apparent from the following detailed description when taken with the drawings in which.

Figure 1:
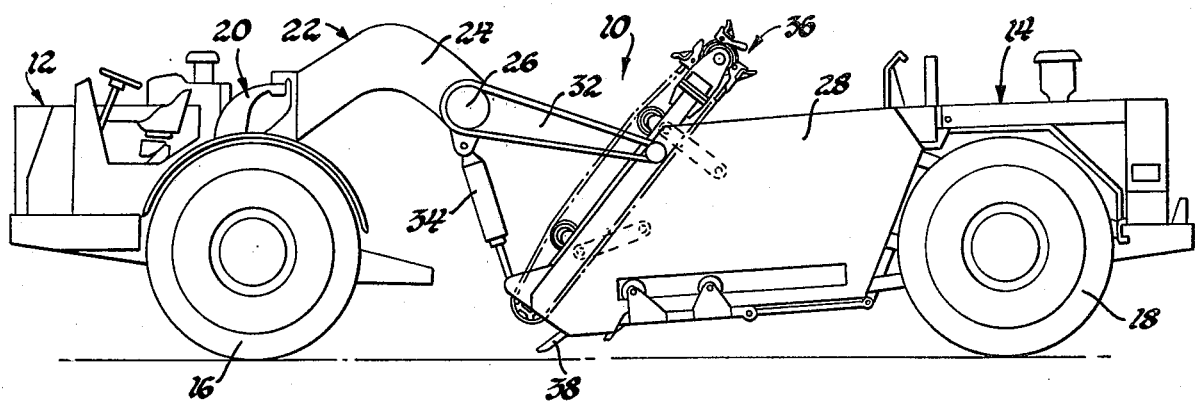
FIG. 1 shows an elevating scraper incorporating an elevator device made in accordance with the invention.

Referring to the drawings and more particularly FIG. 1, thereof, an elevating scraper 10 is shown having the usual overhung tractor 12 and a trailing scraper bowl 14 respectively supported in the usual manner by rubber tires 16 and 18. The tractor 12 is connected through a universal coupling 20 to a pull yoke 22 including a goose neck 24 with a transverse torque tube 26. As is conventional, the opposite ends of the torque tube 26 are provided with laterally spaced pull arms the rearward ends of which are connected by transversely aligned pivot connections to the spaced side walls 28 and 30 of the scraper bowl 14. Only one pull arm is shown in FIG. 1 and is identified by reference numeral 32. As is conventional with elevating scrapers of this type, the front end of the scraper bowl 14 is supported by a pair of bowl cylinders one of which is shown only and identified by the reference numeral 34. Each bowl cylinder 34 has its cylinder end pivotally connected to the torque tube 26 adjacent one end thereof and has its piston rod pivotally connected to the forward end of the associated side wall of the scraper bowl 14. The bowl cylinders serve to move the scraper bowl 14 between the raised carry-position of FIG. 1 and a lowered dig-position.

Figure 2:
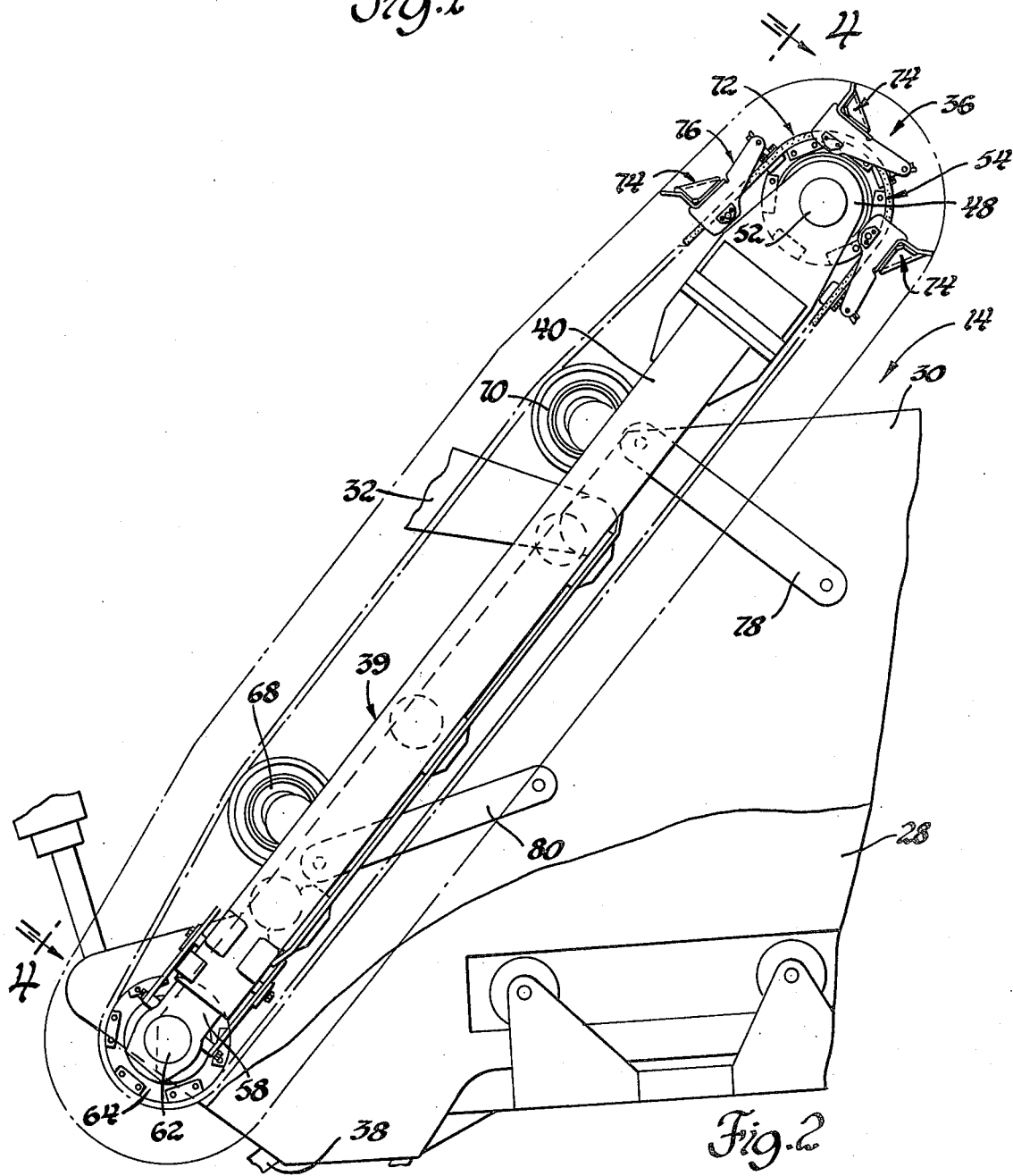
FIG. 2 is an enlarged side view of the elevator device incorporated with the scraper shown in FIG. 1.
Figure 3:
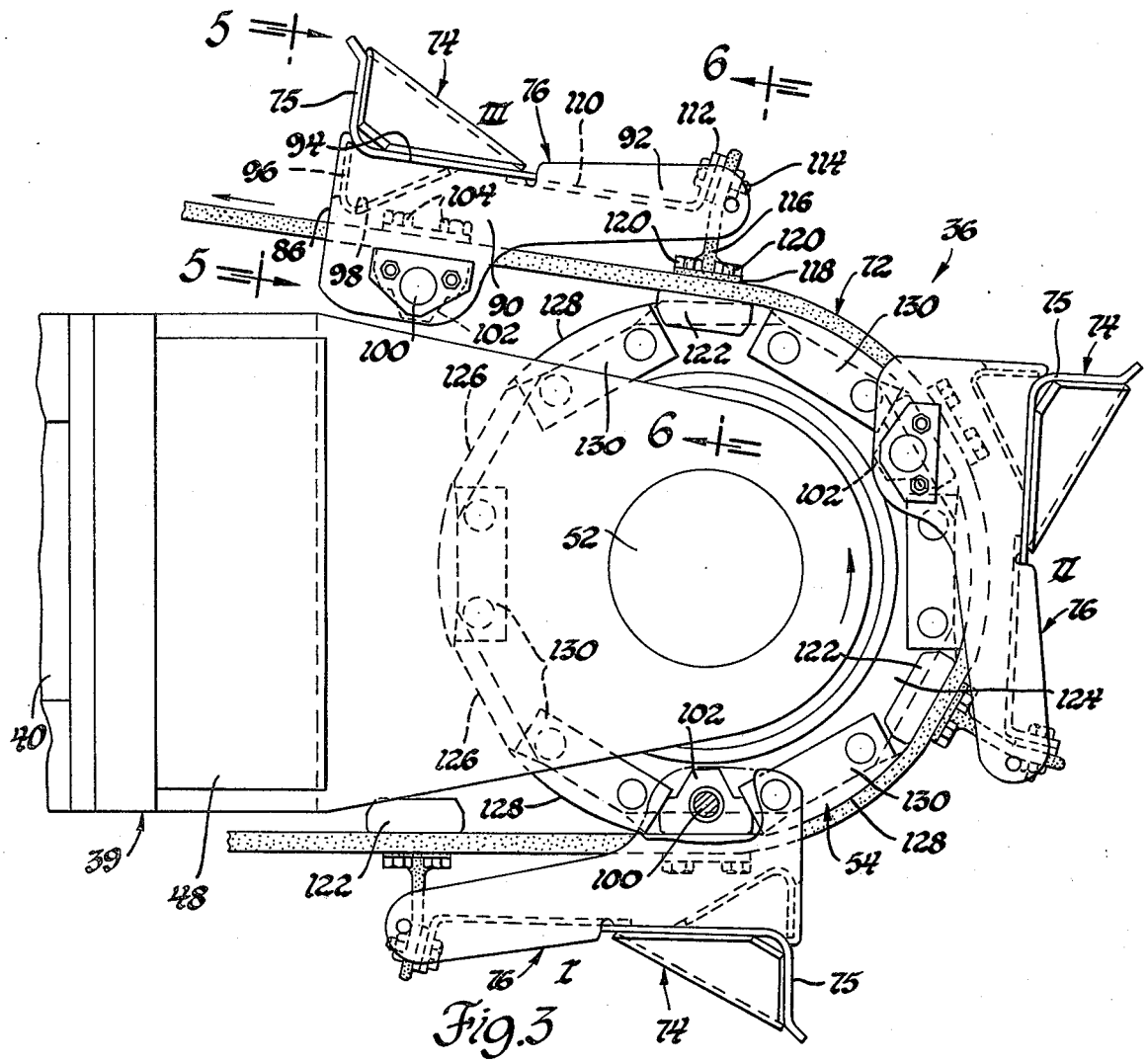
FIG. 3 is a further enlarged view of the upper end of the elevator device of FIG. 2 and shows in detail the mounting arrangement provided for each of the flight members.
Figure 4:
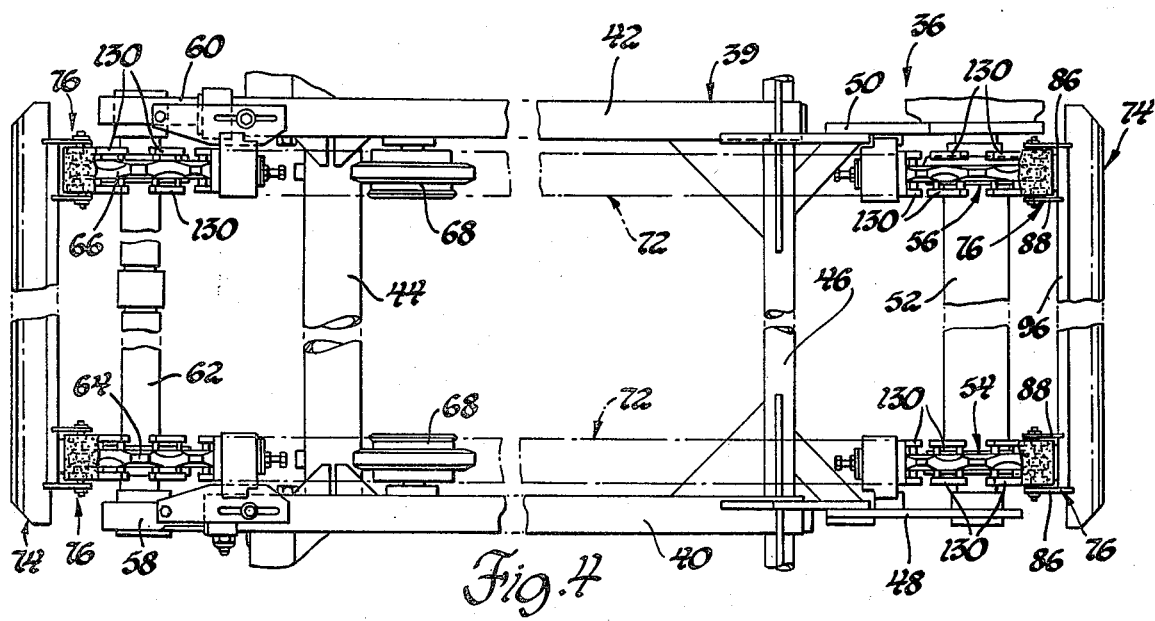
FIG. 4 is a view taken on lines 4—4 of FIG. 2.

The front open end of the scraper bowl 14 is provided with an elevator device 36 the lower end of which is positioned above a transverse cutting blade 38 extending between the side walls 28 and 30. As seen in FIGS. 2, 3 and 4 the elevator device 36 includes a support frame 39 having side rails 40 and 42 rigidly interconnected by transverse cross members 44 and 46. The upper end of side rails 40 and 42 are formed with spaced brackets 48 and 50 which rotatably support a shaft 52 which carries a pair of identical and laterally spaced drive sprocket wheels 54 and 56. Similarly, the lower ends of the side rails 40 and 42 are provided with arms 58 and 60 which rotatably support a shaft 62 having laterally spaced idler sprocket wheels 64 and 66 mounted thereon. As seen in FIG. 2, a pair of guide rollers 68 and 70 are rotatably mounted to each of the guide rails 40 and 42 and together with the drive and idler sprocket wheels serve to support an endless flexible belt 72. Thus, each vertically aligned set of drive sprocket wheel, idler sprocket wheel, and guide rollers have an identical endless belt 72 entrained thereabout which supports the outer ends of a plurality of flight members 74 each of which includes an elongated ground contact plate 75 that is L-shaped in cross section and that extends transversely between the spaced belt members. The flight members 74 are uniformly spaced along the entire outer surface of the belt member and have the opposite ends thereof secured to the belt members through a mounting assembly generally indicated by the reference numeral 76. In addition, each side rail of the support frame 39 is connected to the associated side wall of the scraper bowl 14 by a pair of link members 78 and 80 which allow the elevator device 36 to be movable in the usual manner in an upward direction a predetermined amount and be spaced from the cutting blade by an appropriate stop member (not shown) which limits the downward movement of the lower link member 80.

Figure 5:
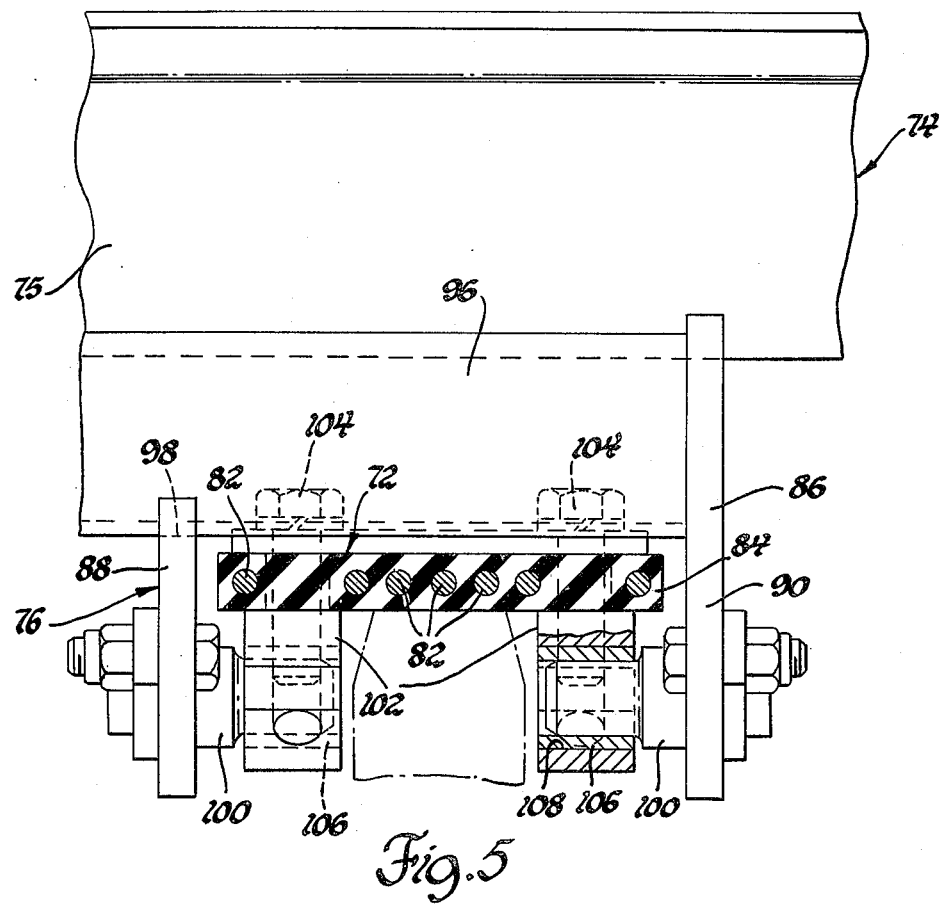
FIG. 5 is an enlarged sectional view taken on line 5—5 of FIG. 3.

The belt member 72 is composed of a plurality of separate sections which are interconnected to form an endless belt. Each section has apertures therein at appropriate places for purposes of connecting the mounting assemblies 76 of each flight member 74 to the belt member and for joining the sections together. As seen in FIG. 5, each section of the belt member includes a plurality of elongated wire cables 82 located along parallel axes and having the opposite ends thereof secured to connector bars. The cables as well as the connector bars are completely embedded within a generally rectangular block of an elastomeric material 84. One method for manufacturing belt sections of this type can be seen in U.S. Pat. No. 3,091,837, in the name of D. B. McCormick and assigned to the assignee of this invention.

Referring to FIG. 3, the mounting assembly 76 connecting each end of a flight member 74 to the associated belt member 72 can be seen in FIGS. 3 and 5 as comprising a pair of substantially identical support plates 86 and 88 located on opposite sides of the belt member 72. The support plate 86 is formed with an enlarged portion 90 and an arm 92 that extends therefrom with the enlarged portion having an outer support surface 94 to which the ground contact plate 75 of the associated flight member is rigidly connected. In addition, the inner side wall of the support plate 86 is fixed with one end of a V-shaped channel member 96 the legs of which are rigid with the underside of the ground contact plate 75. The channel member 96 extends transversely for rigid connection with the side wall of a similar support member 86 attached to the endless belt member on the opposite side of the support frame 39 as seen in FIG. 4. The other support plate 88 is, as mentioned above, identical to the support plate 86 but has a V-shaped cut-out portion 98 in its enlarged portion that is secured to and accommodates the underside of the channel member 96.

Figure 6:
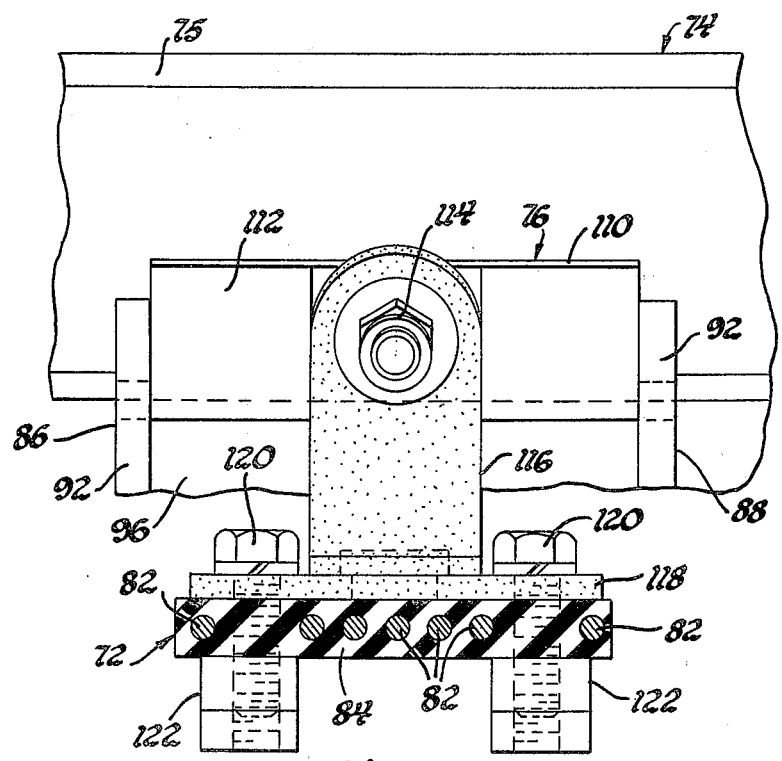
FIG. 6 is an enlarged sectional view taken on line 6—6 of FIG. 3.

As seen in FIG. 5, each of the support plates 86 and 88 supports a stub shaft 100 which extends towards the belt member 72 and is received within a generally V-shaped tooth 102 fastened to the belt member 22 adjacent one side thereof and between a pair of cables 82 by a pair of cap screws 104. It should be understood that the stub shafts 100 carried by the support plates 86 and 88 of each mounting assembly are aligned along a transverse horizontal axis and, as seen in FIG. 5, each stub shaft extends into a bushing 106 pressfitted within a bore 108 formed in the associated tooth. The arms 92 of each pair of the support plates 86 and 88 are interconnected by a cross member 110 having a flange 112 through which a bolt 114 extends for connection with an outer end of a flexible strap 116. Thus, as seen in FIGS. 2 and 6, the strap 116 is preferably formed from an elastomeric material and has the lower end thereof provided with an integral base 118 which is bolted to the belt member 72 through four cap screws 120 each pair of which is threadably received by and secured to a tooth 122 located at the inner surface of the belt member 72. It will be understood that, as seen in FIG. 3, spacing of the bolts along the longitudinal axis of the belt member 72 is the same for each tooth 102 and 122.

The drive sprocket wheels 54 and 56 and the idler sprocket wheels 64 and 66 are substantially identical in construction and each consists of a disc member 124 which has a plurality of planar surfaces 126 and arcuate surfaces 128 formed along the periphery thereof. The planar surfaces 126 are of equal longitudinal length and the arcuate surfaces 128 have chords of equal length. Adjacent to and on opposite sides of each of the arcuate surfaces, a pair of identical driver members 130 are rigidly connected to the disc member 124 and extend outwardly therefrom. The spacing between the driver members 130 along the circumference of the disc member 124 is such that the teeth 102 and 122 attached to the inner surface of the belt member 72 and associated with the mounting assembly 76 of each flight member are adapted to move between each adjacent pair of driver members on the drive and idler sprocket wheels.

In operation and as seen in FIGS. 2 and 4, a hydraulic rotary motor (not shown) drivingly rotates the upper shaft 52 in a counterclockwise direction causing the spaced sprocket wheels 54 and 56 to drive the associated belt members 72 in a counterclockwise direction about the drive and idler sprocket wheels. As the lower run of the belt member 72 moves towards the drive sprocket wheel 54 as seen in FIGS. 3 and 5, the teeth 102 straddle the periphery of the disc member 124 and move into the space provided between a pair of adjacent driver members 130. As the mounting assembly 76 moves from the position indicated by the Roman numeral I to the position indicated by the Roman numeral II, the distance between the centers of the teeth 102 and 122, as measured along the longitudinal axis of the belt member 72, decreases due to the curvature of the drive sprocket wheel 54. At the same time, the distance between the center of the stub shaft 100 and the upper connected end of the strap 116 remains constant. The shortening of the distance between the teeth 102 and 122 is compensated for by a bending of the strap 116 associated with the mounting assembly 76. As the mounting assembly 76 moves from the position indicated by Roman numeral II to that indicated by Roman numeral III, the distance between the teeth 102 and 122 increases and the strap 116 returns to its normal position.

One elevator device constructed according to the invention used belt sections which measured approximately 33 inches in length, 4 inches in width, and 0.56 inches thick. The teeth secured to the belt member had a pitch of 8.25 inches and each belt section incorporated seven cables. Each cable was 0.25 inches in diameter and consisted of 7 by 19 alternate lay steel rope.

Various changes and modifications can be made in this construction without departing from the spirit of the invention. Such changes and modifications are contemplated by the inventor and he does not wish to be limited except by the scope of the appended claims.

I claim:

1. A self-loading scraper having a tractor connected by a pull yoke to a trailing scraper bowl, an elevator device located in the scraper bowl, said elevator device comprising a frame, a drive sprocket wheel rotatably supported at the upper end of said frame, an idler sprocket wheel rotatably supported at the lower end of said frame, an endless flexible belt member having an inner surface and an outer surface, said belt member being entrained about said drive and idler sprocket wheels, a plurality of equally spaced teeth secured to the inner surface of said belt member for cooperation with the idler and sprocket wheels, a plurality of flight members, a mounting assembly connecting each of said flight members to a pair of adjacent teeth on said belt member so as to provide a plurality of equally spaced flight members along the outer surface of the belt member, said mounting assembly comprising support means for rigidly carrying an associated flight member, and a pair of pivotal connections located on opposite sides of said belt member adjacent the outer and inner surfaces thereof for connecting the support means to said pair of adjacent teeth so as to allow the centers of said pair of adjacent teeth to move closer together as the belt member moves around the idler and the drive sprocket wheels.

2. A self-loading scraper having a tractor connected by a pull yoke to a trailing scraper bowl, an elevator device located in the scraper bowl, said elevator device comprising a frame, a drive sprocket wheel rotatably supported at the upper end of said frame, an idler sprocket wheel rotatably supported at the lower end of said frame, an endless flexible belt member having an inner surface and an outer surface, said belt member being entrained about said drive and idler sprocket wheels, a plurality of equally spaced teeth secured to the inner surface of said belt member for cooperation with the idler and sprocket wheels, a plurality of flight members, a mouting assembly connecting each of said flight members to a pair of adjacent teeth on said belt member so as to provide a plurality of equally spaced flight members along the outer surface of the belt member, said mounting assembly comprising support means for rigidly carrying an associated flight member, a first pivotal connection located at the inner surface of the belt member for connecting a first portion of said support means to one of said pair of adjacent teeth, and a second pivotal connection located at the outer surface of the belt member for connecting a second portion of the support means to the other of said pair of adjacent teeth so as to allow the centers of said pair of adjacent teeth to move closer togeether as the belt member moves around the idler and the drive sprocket wheels.

3. In combination with a self-loading scraper having a tractor connected by a pull yoke to a trailing scraper bowl, said scraper bowl having an open end defined by a pair of laterally spaced side walls and a transverse cutting blade extending between these side walls, an elevator device located between and carried by the side walls of the scraper bowl, said elevator device comprising a frame, a pair of laterally spaced drive sprocket wheels rotatably supported at the upper end of said frame, a pair of laterally spaced idler sprocket wheels rotatably supported at the lower end of said frame, an endless flexibile belt member for each pair of vertically aligned drive and idler sprocket wheels, each belt member having an inner surface and an outer surface and being entrained about a pair of vertically aligned drive and idler sprocket wheels, a plurality of equally spaced teeth secured to the inner surface of each belt member for cooperation with the associated idler and sprocket wheels, a plurality of flight members, a mounting assembly connecting each of said flight members to a pair of adjacent teeth on each belt member so as to provide a plurality of equally spaced flight members along the outer surface of each belt member, said mounting assembly comprising support plate means for rigidly carrying an associated flight member, a first pivotal connection located at the inner surface of the belt member for connecting a first portion of said support plate means to one of said pair of adjacent teeth, and an elastomeric strap projecting outwardly from the outer surface of the belt member and serving as a second pivotal connection located adjacent the outer surface of the belt member for connecting a second portion of the support plate means to the other of said pair of adjacent teeth so as to allow the centers of said pair of adjacent teeth to move closer together as each belt member moves around the idler and the drive sprocket wheels.

* * * * *